United States Patent
Ho et al.

(10) Patent No.: US 9,576,232 B1
(45) Date of Patent: Feb. 21, 2017

(54) METHOD FOR DECODING BARCODE AND BARCODE DECODING DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yi-Ta Ho, Hsinchu County (TW); Han-Ming Huang, Taichung (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 15/051,756

(22) Filed: Feb. 24, 2016

(30) Foreign Application Priority Data

Nov. 4, 2015 (CN) .......................... 2015 1 0753205

(51) Int. Cl.
*G06K 19/06* (2006.01)

(52) U.S. Cl.
CPC ................ *G06K 19/06046* (2013.01)

(58) Field of Classification Search
CPC ............ G06K 19/06; G06K 7/08; G06K 7/10; G06F 17/00

USPC .......... 235/494, 375, 462.01, 462.16, 462.02
See application file for complete search history.

(56) References Cited

U.S. PATENT DOCUMENTS

| | | | | |
|---|---|---|---|---|
| 5,969,325 A | * | 10/1999 | Hecht ...................... | G06K 7/14 235/455 |
| 6,279,828 B1 | * | 8/2001 | Fann ................ | G06K 19/06028 235/462.01 |
| 2002/0125330 A1 | * | 9/2002 | Schuessler ........ | G06K 19/06028 235/494 |
| 2006/0213999 A1 | * | 9/2006 | Wang .................. | G06K 7/1093 235/462.25 |
| 2016/0104022 A1 | * | 4/2016 | Negro .................. | G06K 7/1452 235/462.16 |

\* cited by examiner

*Primary Examiner* — Edwyn Labaze
(74) *Attorney, Agent, or Firm* — Li & Cai Intellectual Property (USA) Office (57) ABSTRACT

A structure, a decoding method and a decoding device of a barcode are disclosed. One data code of the barcode of the present invention has 8-bit information quantity. Therefore, based on the same print length of the Code 128 barcode, the information density of the barcode of the present invention can be increased and the encoding and the following operation of the barcode can be simplified. In addition, the barcode of the present invention can be configured on a plane of an object, around a plane of a disc, or around a circular side of a cylinder, enabling the decoding device of the present invention to identify the data code, indicating 8-bit information of the barcode, scanned through a corresponding linear motion, disc rotation, or cylinder rotation.

18 Claims, 6 Drawing Sheets

METHOD FOR DECODING BARCODE AND BARCODE DECODING DEVICE

TECHNICAL FIELD

The present invention relates to a barcode structure, a method for decoding barcode and a barcode decoding device, and in particular, to a barcode structure indicating 8-bit data, as well as a method for decoding barcode and a barcode decoding device in combination with the barcode structure.

BACKGROUND ART

Many commercial products use the Code 128 encoding algorithm as a standard for establishing one-dimensional barcodes. However, for the requirement of a barcode having higher quantity of data in a limited space, general barcodes based on the Code 128 algorithm have become inadequate.

For example, one-dimensional barcodes are printed on reagent trays and consumable medical devices to provide information required for detection and calculation purposes. In common one-dimensional barcodes, Code 128 based barcodes have the highest information density. In such Code 128 based barcodes, each character consists of "3 bars and 3 spaces". The sum of the widths of the "3 bars and the 3 spaces" is a width of 11 units. The unit width (i.e. the minimum width of each bar or space) of such barcodes may be different by design, and maximum width of the bar or spaces is 4 times of a minimum width. One character may have, upto, 7-bit of information. For indicating 8-bit data, we have to rearrange all these 8-bit data into several code 128 based characters, resulting in inconvenience in encoding, decoding and operation. Therefore increases the complexity in data management.

Thus, if the Code 128 based barcode would be expanded to indicate every 8-bit data, the information density of the barcode can be increased and the encoding, decoding and the subsequent operation can be simplified.

SUMMARY OF THE PRESENT INVENTION

An embodiment of the present invention provides a barcode structure for indicating 8-bit data. The barcode structure comprises a data sequence, a start symbol and an end symbol. The data sequence has a start side and an end side, and a data code is arranged between the start side and the end side. The data code consists either "3 bars and 3 spaces" or "2 bars and 2 spaces". In the data code, the plurality of bars and the plurality of spaces are alternately arranged and started from a bar. For data codes with "3 bars and 3 spaces", the sum of the widths of the "3 bars and the 3 spaces" is a width of 11 units. For data codes with "2 bars and 2 spaces", the sum of the widths of the "2 bars and the 2 spaces" is also a width of 11 units. The start symbol is connected in series with the start side, and followed by the plurality of bars and the plurality spaces of the data sequence. For the start symbol, we can have space or combination of spaces and bars that violates the rules we defined for data code. The simplest start symbol is a space, which has a width more than four units. Usually we choice the at-least-five-unit-width-space as the start symbol. The end symbol is connected in series with the end side which is preceeded by the plurality of bars and the plurality of spaces of the data sequence. We usually choice the at-least-two-unit-width-bar as the end symbol. Of course we can have bars or combination of bars and spaces that violates the data code rules as the end symbol.

The barcode structure in an embodiment of the present invention may further comprise one or more additional data code(s), and the additional data code(s) is/are arranged between the data code and the end side. The additional data code(s) also consist(s) either "3 bars and 3 spaces" or "2 bars and 2 spaces". In the additional data code, the plurality of bars and the plurality of spaces are alternately arranged and started from a bar. The width of the additional data code is also 11-unit-width. That is the structure of the additional data code is same as the data code. So we use data code to refer both "the data code" and "the additional data code".

An embodiment of the present invention provides a method for decoding barcode, which is suitable for a barcode decoding device used for scanning the abovementioned barcode structure. Especially it is very good for barcode structure with at-least-five-unit-width-space as the start symbol, and an at-least-two-unit-width-bar as the end symbol. The barcode is arranged around a circular side of a cylinder, and data codes are present in the data sequence of the barcode. The method for decoding barcode comprises the following steps: scanning a barcode arranged on an object; acquiring a plurality of bars and a plurality of spaces alternately arranged in the plurality of data codes, according to the start symbol (at-least-five-unit-width-space as the start symbol) of the barcode; calculating durations of the plurality of bars, the plurality of spaces and an end symbol (at-least-two-unit-width-bar as the end symbol); summing the durations of the plurality of bars and the plurality of spaces, thereby calculating an average duration of each data code, and calculating the duration of a width of 1 unit according to one or a combination of the duration of the end symbol and the duration of the start symbol; determining whether each data code consists of "3 bars and 3 spaces" or consists of "2 bars and 2 spaces", according to the average duration, the durations of the plurality of bars and the durations of the plurality of spaces; and calculating the width of the plurality of bars and the width of the plurality of spaces for each data code, according to the duration of the width of 1 unit, the durations of the plurality of bars and the durations of the plurality of spaces, thereby identifying 8-bit data represented by each data code.

An embodiment of the present invention provides a barcode decoding device for scanning the abovementioned barcode structure, and a plurality of data codes are present in the data sequence of the barcode. The barcode decoding device comprises an object, a light emitter, a light sensor and a processor. The object is arranged with a barcode. The light emitter is arranged around the barcode for emitting an incident light signal to the barcode. The light sensor is arranged around the barcode corresponding to the light emitter, to receive a reflected light signal reflected from the incident light signal and generate an output signal representing the barcode according to the reflected light signal. The processor is connected to the object and the light sensor for controlling movement of the object and receiving the output signal according to the movement of the object, to decode the barcode according to the output signal. A high level of the output signal represents the bars of the barcode. A low level of the output signal represents the spaces of the barcode. A low level of the output signal with a width of 5 or more units represents the start symbol of the barcode. A high level of the output signal with a width of 2 or more units may represent the end symbol of the barcode. The processor is used to perform the following steps: acquiring the output signal to analyze the barcode according to the output signal;

acquiring the plurality of bars and the plurality of spaces alternately arranged in the plurality of data codes, according to the start symbol of the barcode; calculating the durations of the plurality of bars, the plurality of spaces and the end symbol; summing the durations of the plurality of bars and the plurality of spaces, thereby calculating an average duration of each data code, and calculating the duration of a width of 1 unit, according to one or a combination of the duration of the end symbol and the duration of the start symbol; calculating a conditional duration over which the data codes can be formed according to the average duration and the duration of a width of 1 unit; determining whether each data code consists of "3 bars and 3 spaces" or consists of "2 bars and 2 spaces", according to the conditional duration, the durations of the plurality of bars and the durations of the plurality of spaces; and calculating the width of the plurality of bars and the width of the plurality of spaces for each data code, according to the duration of a width of 1 unit, the durations of the plurality of bars and the durations of the plurality of spaces, thereby identifying 8-bit data represented by each data code.

In summary, embodiments of the present invention provide a barcode structure, a method for decoding barcode and a barcode decoding device. Compared with the conventional Code 128 barcode in which one character may have 7-bit of information, one data code of the barcode of the present invention could have 8-bit of information. Thus, based on the same print length of the Code 128 barcode, the information density of the barcode of the present invention can be increased and the encoding and the subsequent operation can be simplified. In addition, the barcode of the present invention can be configured in a plane of an object, annularly arranged on a plane of a disc, or around a circular side of a cylinder. Therefore, the barcode decoding device of the present invention identifies, from the barcode, the data code(s) indicating 8-bit data through a corresponding linear motion, disc rotation or cylinder rotation.

In order to further understand the features and technical content of the present invention, reference is made to the following detailed description and accompanying drawings of the present invention. However, the description and accompanying drawings are only intended to illustrate the present invention, but do not limit the scope of the present invention.

DETAILED DESCRIPTION OF THE PREFERRED EMBODIMENTS

The present invention will hereinafter be described in detail by exemplary embodiments taken in conjunction with the accompanying drawings. However, the concept of the present invention may be embodied in many different forms and should not be construed as limited to the exemplary embodiments set forth herein. Moreover, similar reference numerals are used to refer to similar components throughout the drawings.

The embodiments of the present invention provide a barcode structure, a method for decoding such barcode and a barcode decoding device. In the barcode structure of the present invention, each character (e.g. data code) consists of "3 bars and 3 spaces" or consists of "2 bars and 2 spaces". Each bar and each space, in a data code, may have different widths, and a maximum width is 4 times of a minimum width. Therefore, one barcode data code of the present invention can have 8-bit of information. Thus, based on the same print length of the Code 128 barcode, the information density of the barcode of the present invention can be increased and the encoding, decoding and the subsequent operation can be simplified. In addition, the barcode of the present invention can be configured in a plane of an object, annularly arranged on a plane of a disc, or around a circular side of a cylinder, and a plurality of data codes representing 8-bit data are present in the barcode. Therefore, the barcode decoding device of the present invention can identify whether each character of the barcode consists of "3 bars and 3 spaces" or consists of "2 bars and 2 spaces" through a corresponding linear motion, disc rotation or cylinder rotation, thereby identifying 8-bit data represented by each data code. To differ from the conventional Code 128, we name our invention as Code 256 for convenience. The Code 256 encoding and decoding method disclosed by the present invention is further introduced below.

Figure 1:
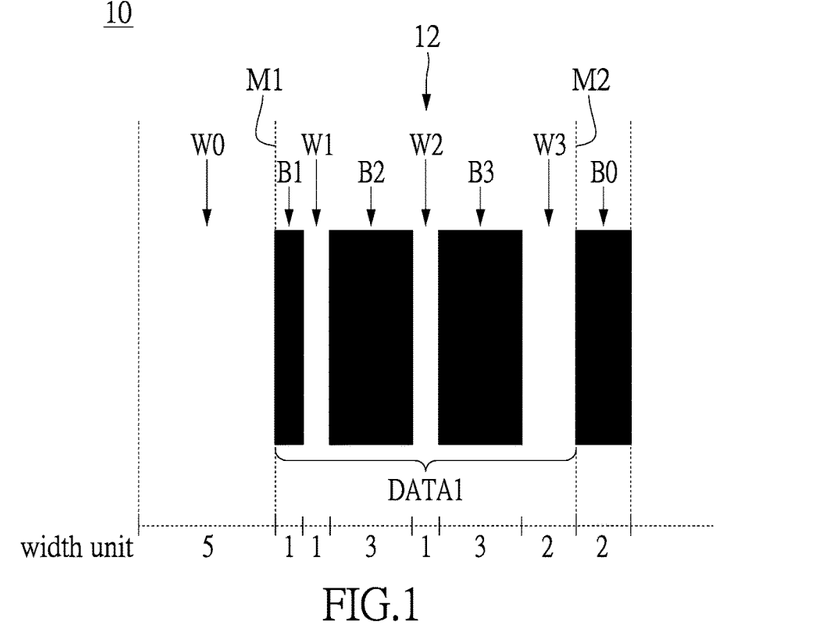
FIG. 1 is a schematic view of a barcode structure according to an embodiment of the present invention, which has a "3 bars and 3 spaces" data code.

FIG. 1 is a schematic view of a barcode structure according to an embodiment of the present invention. As shown in FIG. 1, the barcode structure 10 is a barcode which data code is based on a conventional Code 128 barcode rules, but we use it to indicate an 8-bit data. The barcode 10 comprises a start symbol W0, a data sequence 12 and an end symbol B0.

The data sequence 12 has a start side M1 and an end side M2, and a data code DATA1 is arranged between the start side M1 and the end side M2. As shown in FIG. 1, the data code DATA1 consists of 3 bars, B1, B2 and B3, and 3 spaces, W1, W2 and W3. Starting from the bar B1 in the data code DATA1, the bars B2 and B3 and the spaces W1, W2 and W3 are alternately arranged. Namely, the data code DATA1 is constituted in an arrangement of the bar B1, space W1, bar B2, space W2, bar B3, and space W3.

It should be noted that the sum of the widths of "3 bars and 3 spaces" is a width of 11 units. The width of each bar and the width of each space may be different by design. The minimum width of the bars B1, B2 and B3 and the minimum width of the spaces W1, W2 and W3 is a width of 1 unit. The maximum width of the bars B1, B2 and B3 and the maximum width of the spaces W1, W2 and W3 is a width of 4 units. For example, for the data code DATA1 in FIG. 1, the bar B1 has a width of 1 unit, the space W1 has a width of 1 unit, the bar B2 has a width of 3 units, the space W2 has a width of 1 unit, the bar B3 has a width of 3 units, and the space W3 has a width of 2 units. Therefore, in this embodiment, the data code DATA1 is regarded as a character "113132" according to the widths of the bars B1, B2 and B3 and the spaces W1, W2 and W3, and the character "113132" corresponds to an 8-bit data. In the present embodiment, the 8-bit data which the character "113132" corresponds to is 120 (decimal representation). The character "113132" may also correspond to another 8-bit data such as 100 (decimal representation) depending on actual conditions, and the present invention is not limited thereto.

The start symbol W0 is connected in series with the start side M1 (namely, the start symbol W0 abuts the bar B1), and is arranged in parallel with the bars B1, B2 and B3 and the spaces W1, W2 and W3 of the data sequence 12. Since the maximum width of the bars B1, B2 and B3 and the maximum width of the spaces W1, W2 and W3 is a width of 4 units, the simplest start symbol is a space with the width is more than 4 units, to facilitate identifying the data code DATA1 of the data sequence 12 from the start symbol W0 through the width units of the bars and the spaces in a subsequent decoding process. In the present embodiment, the width of the start symbol W0 is a space which is set to a width of 5 units.

The end symbol B0 is connected in series with the end side M2 (namely, the end symbol B0 abuts the space W3), and is arranged in parallel with the bars B1, B2 and B3 and the spaces W1, W2 and W3 of the data sequence 12. We choice the end symbol as a bar, and the width of the end symbol B0 is set at a width of 2 or more units, to facilitate ascertaining the end of the data code DATA1 through the end symbol B0 having a width of 2 or more units in subsequent decoding of the bars B1, B2 and B3 and the spaces W1, W2 and W3. In the present embodiment, the width of the end symbol B0 is a bar which is set to a width of 2 units.

In addition, the heights of the bars B1, B2 and B3, the spaces W1, W2 and W3, the start symbol W0 and the end symbol B0 are equal or substantially equal, to avoid influencing the reading of the barcode 10 due to uneven heights.

Figure 2:
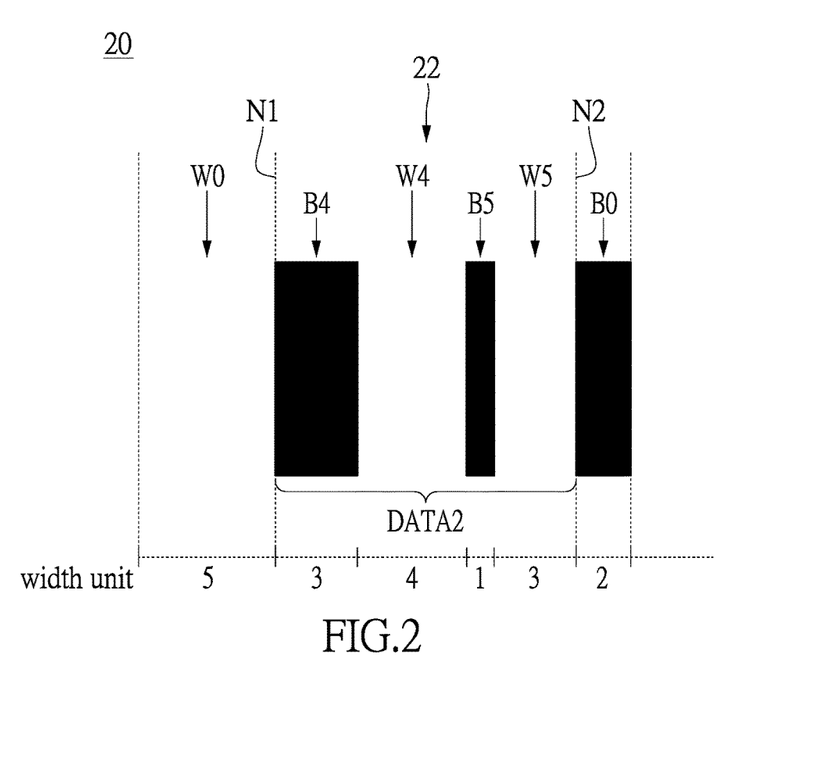
FIG. 2 is a schematic view of a barcode structure according to an embodiment of the present invention, which has a "2 bars and 2 spaces" data code.

Other than consisting of "3 bars and 3 spaces" that are arranged in parallel, the data code may also be arranged to consist of "2 bars and 2 spaces" that are arranged in parallel. As shown in FIG. 2, the structure of the barcode 20 is a barcode based on this invention for indicating an 8-bit data. The barcode 20 comprises a start symbol W0, a data sequence 22 and an end symbol B0.

The data sequence 22 has a start side N1 and an end side N2, and a data code DATA2 is arranged between the start side N1 and the end side N2. As shown in FIG. 2, the data code DATA2 consists of 2 bars, B4 and B5, and 2 spaces, W4 and W5, that are arranged in parallel. Starting from the bar B4 in the data code DATA2, the bar B5 and the spaces W4 and W5 are alternately arranged. Namely, the data code DATA2 is constituted in an arrangement of the bar B4, space W4, bar B5, and space W5.

Similarly, the sum of the widths of the 2 bars, B4 and B5, and the 2 spaces, W4 and W5, is a width of 11 units. The width of each bar and the width of each space, in data code, may be different by design. The minimum width of the bars B4 and B5 and the minimum width of the spaces W4 and W5 is a width of 1 unit. The maximum width of the bars B4 and B5 and the maximum width of the spaces W4 and W5 is a width of 4 units. For example, for the data code DATA2 in FIG. 2, the bar B4 has a width of 3 units, the space W4 has a width of 4 units, the bar B5 has a width of 1 unit, and the space W5 has a width of 3 units. Therefore, the data code DATA2 is regarded as a character "3413" according to the widths of the bars B4 and B5 and the spaces W4 and W5, and the character "3413" corresponds to an 8-bit data. In the present embodiment, the 8-bit data which the character "3413" corresponds to is 228 (decimal representation). The character "3413" may also correspond to another 8-bit data such as 250 (decimal representation) depending on actual conditions, and the present invention is not limited thereto.

The start symbol W0 is connected in series with the start side N1 (namely, the start symbol W0 abuts the bar B4), and is arranged in parallel with the bars B4 and B5 and the spaces W4 and W5 of the data sequence 22. Similarly, as mentioned above, the simplest start symbol W0 is a space with the width is more than 4 units. In the present embodiment, the width of the start symbol W0 is a space which is set to a width of 5 units The end symbol B0 is connected in series with the end side N2 (namely, the end symbol B0 abuts the space W5), and is arranged in parallel with the bars B4 and B5 and the spaces W4 and W5 of the data sequence 22. As mentioned above, We choice the end symbol B0 as a bar, and the width of the end symbol B0 is set at a width of 2 or more units. In the present embodiment, the width of the end symbol B0 is a bar which set to a width of 2 units.

In addition, the heights of the bars B4 and B5, the spaces W4 and W5, the start symbol W0 and the end symbol B0 are equal or substantially equal, to avoid influencing the reading of the barcode 20 due to uneven heights.

It can be known from the structures of the barcodes 10 and 20 that, the data code consists of "3 bars and 3 spaces" that are arranged in parallel (for example, the bars B1-B3 and the spaces W1-W3 in FIG. 1), or consists of "2 bars and 2 spaces" that are arranged in parallel (for example, the bars B4-B5 and the spaces W4-W5 in FIG. 2). The plurality of bars and the plurality of spaces are alternately arranged starting from a bar in the data code (for example, the bars B1-B3 and the spaces W1-W3 being alternately arranged in FIG. 1 and the bars B4-B5 and the spaces W4-W5 being alternately arranged in FIG. 2). The sum of the widths of the "3 bars and the 3 spaces" is a width of 11 units, and the sum of the widths of the "2 bars and the 2 spaces" is also a width of 11 units.

Therefore, when a data code consists of "3 bars and 3 spaces", the number of all the possible combinations of width units as shown in Table 1.

TABLE 1

| Combinations of width units | Number of combinations |
| --- | --- |
| 111134 | $\frac{6!}{4!} = 30$ (Quantity) |
| 111224 | $\frac{6!}{3!2!} = \frac{720}{6 \times 2} = 60$ (Quantity) |
| 111233 | $\frac{6!}{3!2!} = \frac{720}{6 \times 2} = 60$ (Quantity) |
| 112223 | $\frac{6!}{2!3!} = \frac{720}{6 \times 2} = 60$ (Quantity) |
| 122222 | $\frac{6!}{5!} = 6$ (Quantity) |
| Total | 216 (Quanity) |

The data code shown in Table 1 has 5 types of combinations of width units, "111134", "111224", "111233", "112223" and "122222". Namely, on the premise that the sum of the widths of "3 bars and 3 spaces" is a width of 11 units, the bars and the spaces have different combinations of width units. As an example, the combination "111134" indicates having a combination of 4 bars and/or spaces with a width of 1 unit, a combination of 1 bar or space with a width of 3 units, and a combination of 1 bar or space with a width of 4 units, to comply with the limitation that the sum of the widths of "3 bars and 3 spaces" is a width of 11 units, accordingly generating 30 different combinations. As another example, the combination "112223" indicates having a combination of 2 bars or spaces with a width of 1 unit, a combination of 3 bars or spaces with a width of 2 units, and a combination of 1 bar or space with a width of 3 units, to comply with the limitation that the sum of the widths of "3 bars and 3 spaces" is a width of 11 units, accordingly generating 60 different combinations. Therefore, for a data code consisting of "3 bars and 3 spaces", there are 216 different combinations of such width units.

Furthermore, when a data code consists of "2 bars and 2 spaces", the number of all possible combinations of width units as shown in Table 2.

TABLE 2

| Combinations of width units | Number of combinations |
| --- | --- |
| 1244 | $\frac{4!}{2!} = 12$ (Quantity) |
| 1334 | $\frac{4!}{2!} = \frac{24}{2} = 12$ (Quantity) |
| 2234 | $\frac{4!}{2!} = \frac{24}{2} = 12$ (Quantity) |
| 2333 | $\frac{4!}{3!} = \frac{24}{6} = 4$ (Quantity) |
| Total | 40 (quantity) |

The data code shown in Table 2 has 4 types of combinations of width units, "1244", "1334", "2234" and "2333". Namely, on the premise that the sum of the widths of "2 bars and 2 spaces" is a width of 11 units, the bars and the spaces have different combinations of width units. As an example, the combination "1244" indicates having a combination of 1 bar or space with a width of 1 unit, a combination of 1 bar or space with a width of 2 units, and a combination of 2 bars and/or spaces with a width of 4 units, to comply with the limitation that the sum of the widths of "2 bars and 2 spaces" is a width of 11 units, accordingly generating 12 different combinations. As another example, the combination "2234" indicates having a combination of 2 bars and spaces with a width of 2 units, a combination of 1 bar or space with a width of 3 units, and a combination of 1 bar or space with a width of 4 units, to comply with the limitation that the sum of the widths of 2 bars and 2 spaces is a width of 11 units, accordingly generating 12 different combinations. Therefore, for a data code consisting of "2 bars and 2 spaces", there are 40 different combinations.

Accordingly, with the above limits to the data code, 216+40=256 different combinations of widths units are generated, accordingly indicating 2 power of 8 (i.e. 256) different data. Thus, compared with the conventional Code 128 barcode in which one character may have 7-bit of information, the data code of the barcode of the present invention could have 8-bit of information, such that the data code can indicate 256 different data. Thus, based on the same print length of the Code 128 barcode, the information density of the barcode of the present invention can be increased and the encoding, decoding and the subsequent operation can be simplified.

Figure 3:
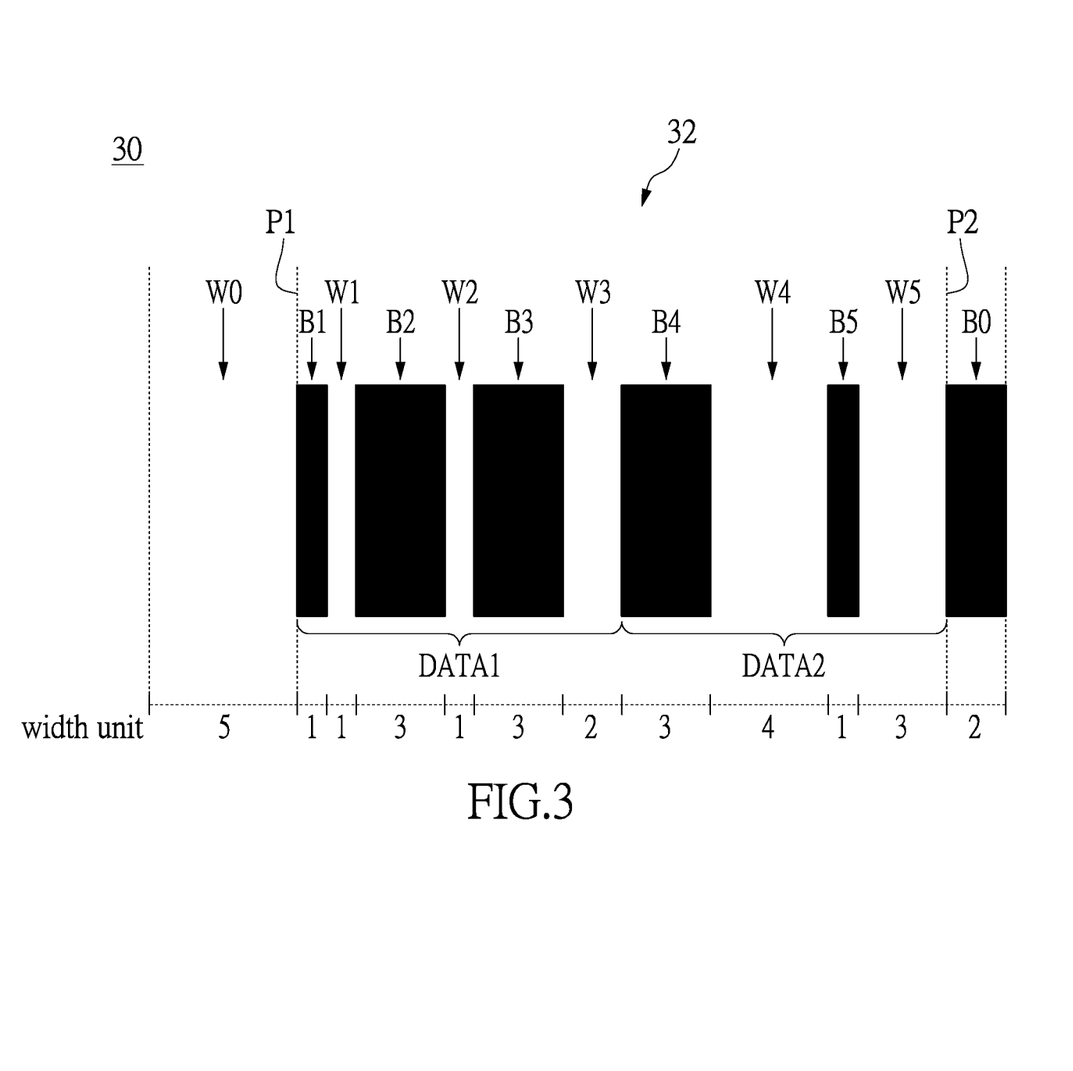
FIG. 3 is a schematic view of a barcode structure according to another embodiment of the present invention which has a "3 bars and 3 spaces" data code and a "2 bars and 2 spaces" additional data code.

Further, if bars and spaces are alternately arranged starting from one space in a data code (not shown), the data code DATA1 is constituted in an arrangement of a space, bar, space, bar, space and bar (not shown), and the data code DATA2 will be constituted in an arrangement of a space, bar, space and bar (not shown). In this case, the start symbol W0 will be correspondingly changed to a start bar (not shown), and the end symbol B0 will be correspondingly changed to an end space (not shown). The limitations on width units of the bars and spaces in the modified data code, the start bar and the end space are generally the same as those of the data codes DATA1 and DATA2, the start symbol W0 and the end symbol B0, and thus are not further described herein. Thus, similarly, with the above limits to the modified data code, 216+40=256 different combinations of width units are generated, accordingly indicating 2 power of 8 (i.e. 256) different data. Further, in the structure of the barcode, a plurality of data codes may be arranged in the data sequence, to indicate a plurality of 8-bit data in one barcode. Additionally refer to FIG. 3, a schematic view of a barcode structure according to another embodiment of the present invention. As shown in FIG. 3, the structure of the barcode 30 is a barcode based on this invention for indicating a plurality of 8-bit data. The barcode 30 comprises a start symbol W0, a data sequence 32 and an end symbol B0. The data sequence has a start side P1 and an end side P2. The data code DATA1 is arranged between the start side P1 and an additional data code DATA2, and the additional data code DATA2 is arranged between the data code DATA1 and the end side P2. The data code DATA1 consisting of 3 bars, B1, B2 and B3, and 3 spaces, W1, W2 and W3, and the data code DATA2 consisting of 2 bars, B4 and B5, and 2 spaces, W4 and W5, have been described in the embodiments above, and thus will not be further described herein. In addition, the start symbol W0 and the end symbol B0 have also been described in the embodiments above, and thus will not be further described herein. Thus, the barcode 30 is in an arrangement of the start symbol (which is a space) W0, bar B1, space W1, bar B2, space W2, bar B3, space W3, bar B4, space W4, bar B5, space W5, and end symbol (which is a bar) B0 from left to right.

Accordingly, the data sequence 32 of the barcode 30 of the present invention is arranged with 2 data codes, such that the barcode 30 can be used to indicate two 8-bit data. If more data codes in series are present in the data sequence 32, the barcode 30 can be used to indicate more 8-bit data.

Figure 4A:
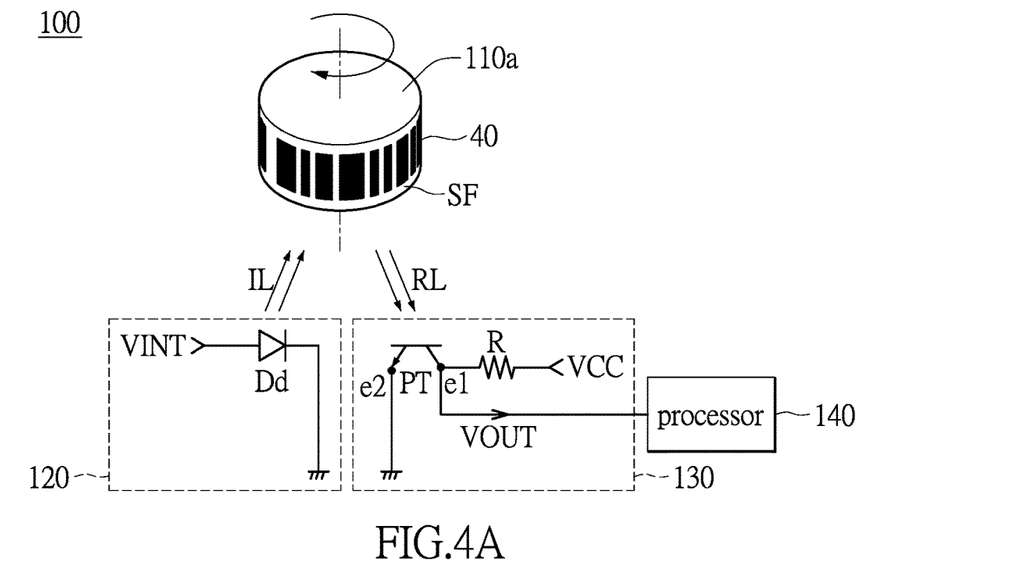
FIG. 4A is a schematic view of a barcode decoding device and a barcode object according to an embodiment of the present invention.
Figure 4B:
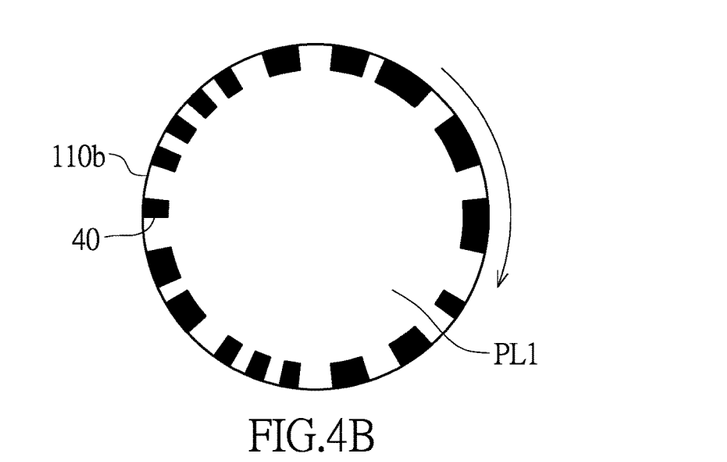
FIG. 4B is another schematic view of a barcode object according to an embodiment of the present invention.
Figure 4C:
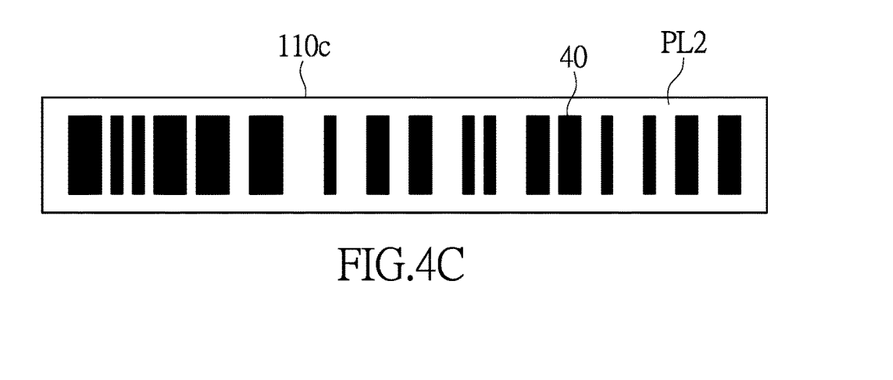
FIG. 4C is another schematic view of a barcode object according to an embodiment of the present invention.

From the embodiment above, the present invention accordingly provides a barcode decoding device, which is suitable for the embodiment above in which a plurality of data codes are arranged in the data sequence, to scan the structure of the barcode arranged with the plurality of data codes and thus ascertain multiple 8-bit data indicated by the barcode. Additionally referring to FIG. 4A, it is a schematic view of a barcode decoding device according to an embodiment of the present invention. As show in FIG. 4A, the decoding device 100 comprises an object 110a, a light emitter 120, a light sensor 130 and a processor 140. The object 110a is arranged with a barcode 40. In the present embodiment, the object 110a is a cylinder. The cylinder has a circular side SF, and the barcode 40 is arranged on the circular side SF. In another embodiment, as shown in FIG. 4B, an object 110b is a disc. The disc has a plane PL1, and the barcode 40 is annularly arranged on the plane PL1. In another embodiment, as shown in FIG. 4C, an object 110c has a plane PL2, and the barcode 40 is arranged in the plane PL2. The form of the object 110a arranged with the barcode 40 may be designed depending on practical conditions, and the present invention is not limited thereto.

The light emitter 120 is arranged around the barcode 40 for emitting an incident light signal IL to the barcode 40. The light sensor 130 is arranged around the barcode 40 corresponding to the light emitter 120, to receive a reflected light signal RL reflected from the incident light signal IL. Since the incident light signal IL is emitted by the light emitter 120 to the barcode 40, the reflected light signal RL contains information of bars and spaces in the barcode 40. Thus, the light sensor 130 generates an output signal VOUT representing the barcode 40 to the processor 140, according to the reflected light signal RL.

In the present embodiment, the light emitter 120 has a light-emitting diode Dd. A positive terminal of the light-emitting diode Dd is electronically connected to a voltage VINT, and a negative terminal of the light-emitting diode Dd is grounded. According to the voltage VINT, the light-emitting diode Dd emits the incident light signal IL to the barcode 40. In addition, the light sensor 130 of the present embodiment has a photo-transistor PT and a resistor R. A terminal e1 of the photo-transistor PT receives an input voltage VCC through the resistor R and is electronically connected to the processor 140. Another terminal e2 of the photo-transistor PT is grounded. Thus, when the reflected light signal RL is received by the photo-transistor PT, the photo-transistor PT generates an output signal VOUT representing the barcode 40 at the terminal e1 to the processor 140, according to the reflected light signal RL. Namely, the output signal VOUT in this case is related to the bars and spaces of the barcode 40. In the present embodiment, the incident light signal IL emitted by the light-emitting diode Dd is infrared light, and the photo-transistor PT is a sensing device capable of sensing infrared light. The incident light signal IL may be emitted as other types of light and a sensing device capable of sensing such light correspondingly arranged at the photo-transistor PT, and the internal structure of the light sensor 130 is not limited by the present invention.

Figure 5:
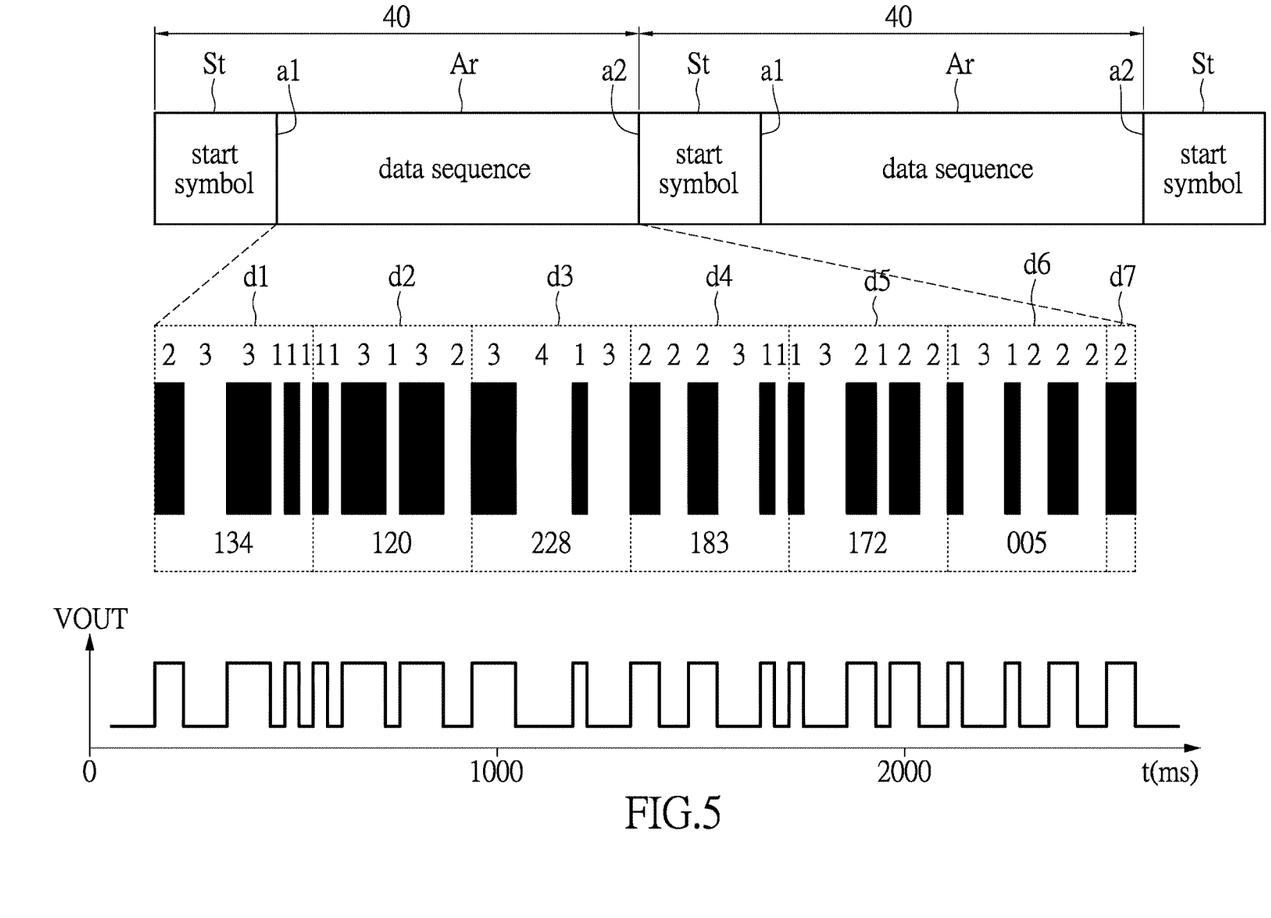
FIG. 5 is a schematic view of a barcode structure according to another embodiment of the present invention.

For ease of illustration, the barcode 40 is described below as being arranged with 6 data codes. As shown in FIG. 5, the barcode 40 has a start symbol (which is a space) St, a data sequence Ar and an end symbol (which is a bar) d7. The start symbol St has a width of 5 units, and the end symbol d7 has a width of 2 units. The data sequence Ar has a start side a1 and an end side a2. The start side a1 abuts the start symbol St and the end side a2 abuts the end symbol d7. The 6 data codes d1, d2, d3, d4, d5 and d6 abut and are located between the start side a1 and the end symbol d7. Each of the data codes d1, d2, d4, d5 and d6 consists of "3 bars and 3 spaces" that are arranged in parallel. The data code d3 consists of "2 bars and 2 spaces" that are arranged in parallel.

The widths of the bars and spaces of the data code d1 are sequentially widths of 2, 3, 3, 1, 1 and 1 unit. The widths of the bars and spaces of the data code d2 are sequentially widths of 1, 1, 3, 1, 3 and 2 units. The widths of the bars and spaces of the data code d3 are sequentially widths of 3, 4, 1 and 3 units. The widths of the bars and spaces of the data code d4 are sequentially widths of 2, 2, 2, 3, 1 and 1 unit. The widths of the bars and spaces of the data code d5 are sequentially widths of 1, 3, 2, 1, 2 and 2 units. The widths of the bars and spaces of the data code d6 are sequentially widths of 1, 3, 1, 2, 2 and 2 units. The sum of the widths of the plurality of bars and the plurality of spaces of each of the data codes d1-d6 is a width of 11 units.

The output signal VOUT is related to the start symbol St, the bars and spaces of the data codes d1-d6 and the end symbol d7 of the barcode 40. Thus, a high level of the output signal VOUT represents the bars of the barcode 40, a low level of the output signal VOUT represents the spaces of the barcode 40, a low level of the output signal VOUT with a width of 5 units represents the start symbol St of the barcode 40, and a high level of the output signal VOUT with a width of 2 units represents the end symbol d7 of the barcode 40. Similarly, the light sensor 130 may also be designed with another internal structure, such that a low level of the output signal VOUT represents the bars of the barcode 40, a high level of the output signal VOUT represents the spaces of the barcode 40, a high level of the output signal VOUT with a width of 5 units represents the start symbol St of the barcode 40, and a low level of the output signal VOUT with a width of 2 units represents the end symbol d7 of the barcode 40, and the present invention is not limited thereto.

Figure 6:
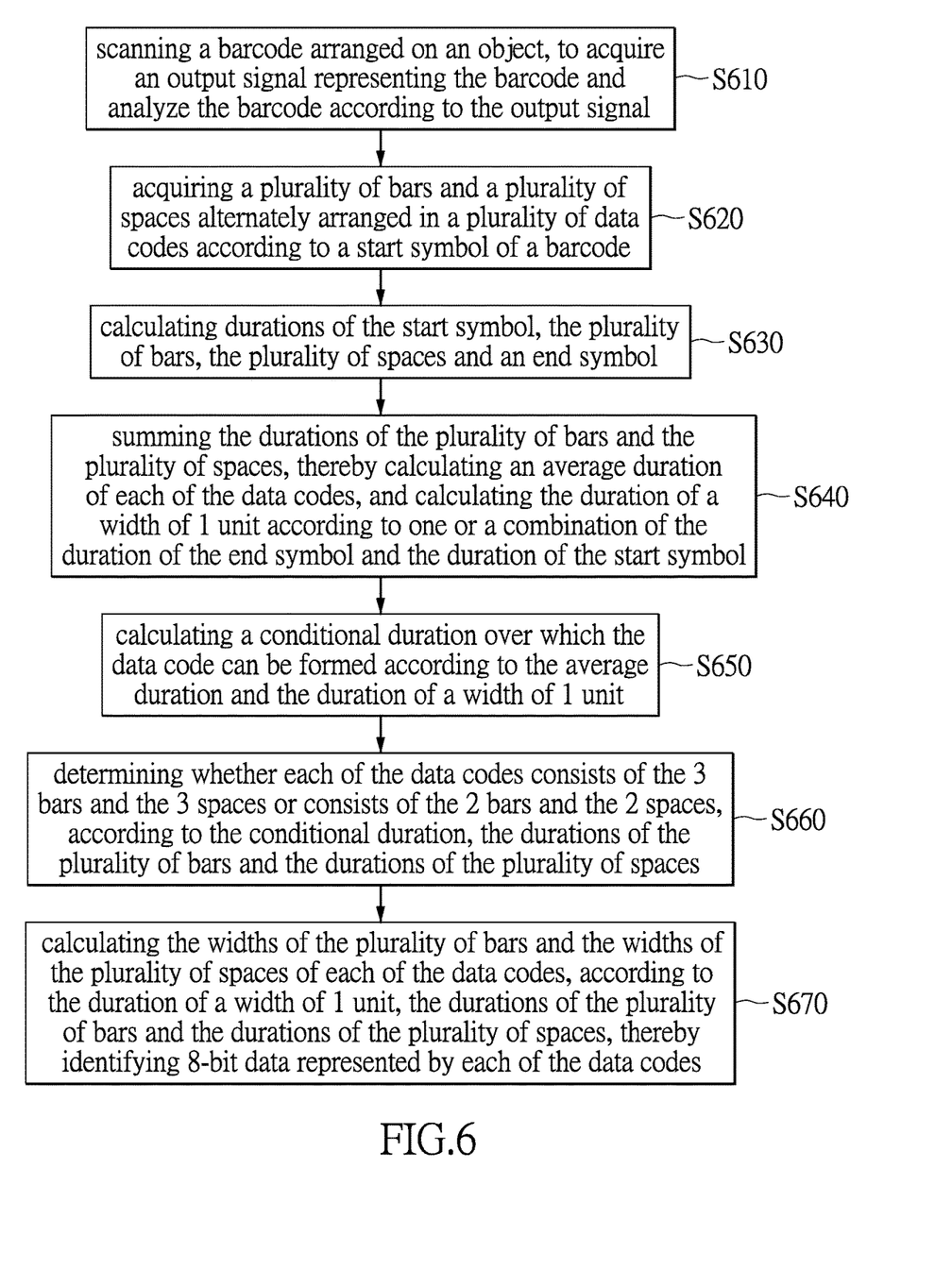
FIG. 6 is a flow chart of a method for decoding barcode according to an embodiment of the present invention.

Referring to both FIG. 5 and FIG. 6, the processor 140 is electronically connected to the object 110a and the light sensor 130 for controlling movement of the object 110a and receiving the output signal VOUT representing the barcode 40 according to the movement of the object 110a, to decode the barcode 40 according to the output signal VOUT. The processor 140 performs the following steps to decode the barcode 40 arranged on the circular side SF. Firstly, the processor 140 scans a barcode 40 arranged on an object 110a to acquire an output signal VOUT representing the barcode 40, so as to analyze the barcode 40 according to the output signal VOUT (Step S610).

More specifically, in this step, given the object 110a is a cylinder as shown in FIG. 4A, the processor 140 requires rotating the cylinder to scan the barcode 40 arranged on the circular side SF. Since the output signal VOUT representing the barcode 40 received by the light sensor 130 is dynamic, the processor 140 requires acquiring the output signal VOUT only when rotating the cylinder at a constant speed, to avoid misinterpretation of the output signal VOUT and a consequent incorrect analysis of the barcode 40. Assuming that the object 110a is an object 110b representing a disc as shown in FIG. 4B, the processor 140 requires rotating the disc to scan the barcode 40 arranged annularly on the plane PL1. Since the output signal VOUT representing the barcode 40 received by the light sensor 130 is dynamic, the processor 140 requires acquiring the output signal VOUT only when rotating the disc at a constant angular speed, to avoid misinterpretation of the output signal VOUT and a consequent incorrect analysis of the barcode 40. Assuming that the object 110a is an object 110c as shown in FIG. 4C, the processor 140 requires moving the plane PL2 to scan the barcode 40, to acquire the output signal VOUT representing the barcode 40.

Next, the processor 140 acquires the plurality of bars and the plurality of spaces alternately arranged in the data codes d1-d6, according to the start symbol St of the barcode 40 (step S620). More specifically, if the object 110a is a cylinder or an object 110b representing a disc, the processor 140 repeatedly generates the start symbol St and the data sequence Ar by rotating the cylinder or the disc, and acquires the plurality of bars and the plurality of spaces alternately arranged in the data codes d1-d6 of the data sequence Ar between the two start symbols St. If the object 110a is an object 110c as shown in FIG. 4C, the processor 140 scans the barcode 40 in the plane PL2 to generate the start symbol St and the data sequence Ar, and acquire the plurality of bars and the plurality of spaces alternately arranged in the data codes d1-d6 of the data sequence Ar between the two start symbols St.

In this case, the plurality of bars and the plurality of spaces of the data codes d1-d6 acquired by the processor 140 have output voltages VOUT of different levels and of different width units; namely, the bars correspond to a high level of the output voltage VOUT, the spaces correspond to a low level of the output voltage VOUT, and the high level and low level of the output voltages VOUT have 1-4 width units according to the design of the bars and spaces. So, the processor 140 then determines the quantities of the bars and spaces of each of the data codes d1-d6 from the output voltages VOUT corresponding to the intervals of the data codes d1-d6, thereby distinguishing each of the data codes d1-d6.

Thus, after the processor 140 receives the plurality of bars and the plurality of spaces of the data codes d1-d6, the processor 140 calculates the durations of the start symbol St, each bar and each space of the data codes d1-d6, and end symbol d7 (step S630), as shown in Table 3 below.

TABLE 3

|  | Bar | Space | Bar | Space | Bar | Space |
|---|---|---|---|---|---|---|
| Start symbol St (ms) |  | 176 |  |  |  |  |
| Data code d1 (ms) | 71 | 104 | 109 | 36 | 34 | 34 |
| Data code d2 (ms) | 37 | 31 | 101 | 37 | 107 | 70 |
| Data code d3 (ms) | 109 | 136 | 35 | 103 |  |  |
| Data code d4 (ms) | 74 | 71 | 69 | 103 | 33 | 31 |
| Data code d5 (ms) | 34 | 108 | 68 | 36 | 67 | 73 |
| Data code d6 (ms) | 33 | 104 | 34 | 69 | 68 | 67 |
| End symbol d7 (ms) | 70 |  |  |  |  |  |

Note:
(ms) means milliseconds

Next, the processor 140 sums the durations of each bar and each space, thereby calculating an average duration of the data codes d1-d6, and calculating the duration of a width of 1 unit according to one or a combination of the duration of the end symbol d7 and the duration of the start symbol St (step S640). More specifically, the processor 140 sums the durations of the bars and spaces of the data codes d1-d6 and divides the sum by the quantities of the data codes, to calculate the average duration of the data codes d1-d6. Namely, the average duration (ms)=(71+104+109+36+34+34)+(37+31+101+37+107+70)+(109+136+35+103)+(74+71+69+103+33+31)+(34+108+68+36+67+73)+(33+104+34+69+68+67)/6=2296/6=382.7 (ms). The processor 140 can calculate the duration of a width of 1 unit according to the duration of the end symbol d7 of a width of 2 units, the duration of the start symbol St of a width of 5 units, or an average duration thereof. For the end symbol d7, the duration (ms) of a width of 1 unit=70/2=35 (ms); for the start symbol St, the duration (ms) of a width of 1 unit=176/5=35.2 (ms); and for an average of the end symbol d7 and the start symbol St, the duration (ms) of a width of 1 unit=(70/2+176/5)/2=35.1 (ms). Accordingly, the processor 140 calculates the average duration of the data codes d1-d6 and the duration of a width of 1 unit, for further subsequent processing.

Further, the processor 140 calculates a conditional duration over which the data codes d1-d6 can be formed according to the average duration and the duration of a width of 1 unit (step S650). More specifically, the processor 140 sums the average duration and the duration of a width of 1 unit to calculate the conditional duration over which the data codes d1-d6 can be formed. For ease of illustration, the following description uses the duration of a width of 1 unit being 35 (ms); namely, the processor 140 calculates the duration of a width of 1 unit according to the duration of the end symbol d7 of a width of 2 units. Thus, the conditional duration (ms)=the average duration+the duration of a width of 1 unit=382.7+35=417.7 ms. The processor 140 may determine the quantities of the bars and spaces in each of the data codes d1-d6 by the conditional duration (for example, the conditional duration=417.7 ms) over which the data codes d1-d6 can be formed, thereby distinguishing each of the data codes d1-d6.

Figure 7:
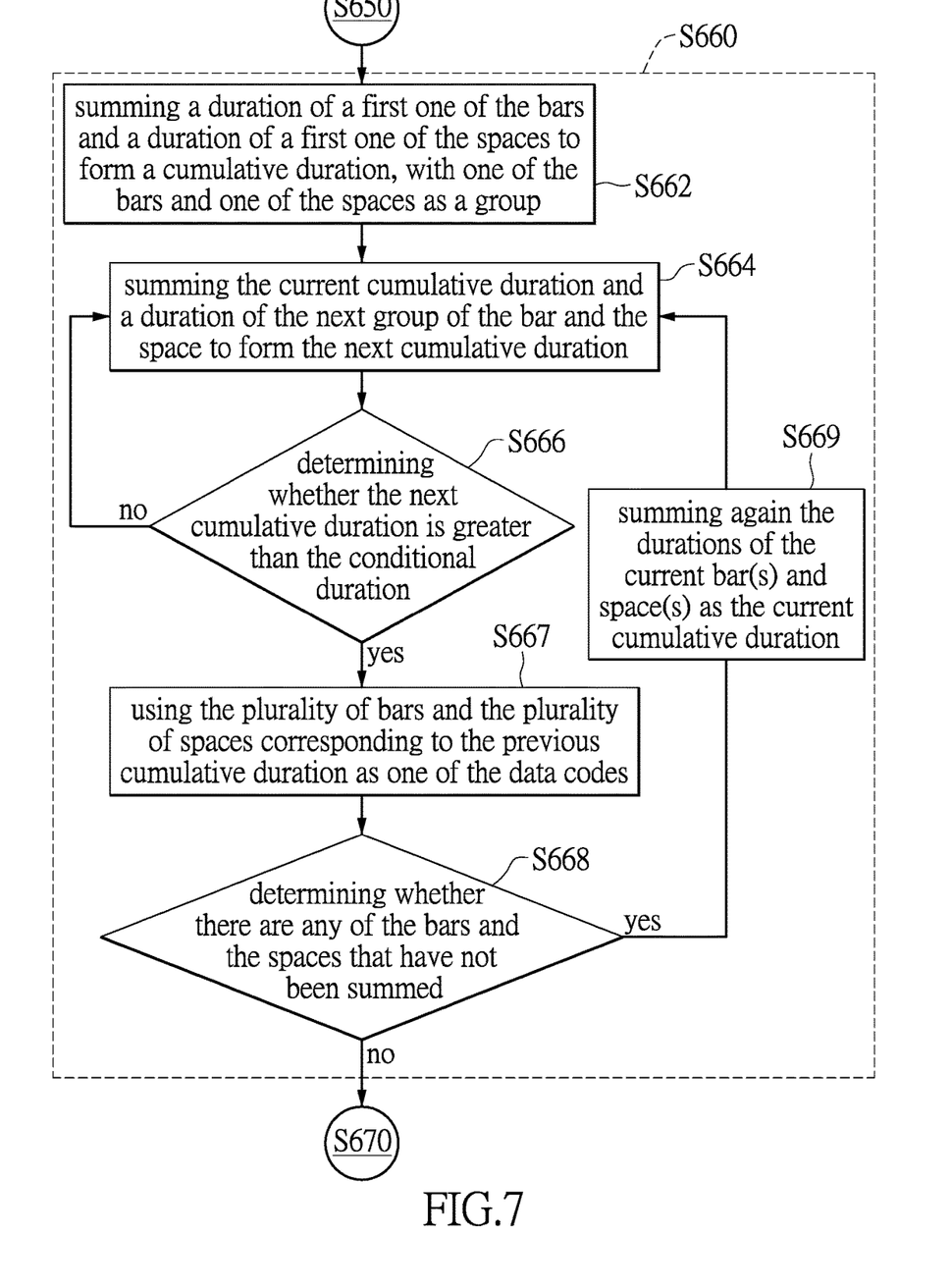
FIG. 7 is a flow chart of determining whether each data code consists of "3 bars and 3 spaces" or consists of "2 bars and 2 spaces" according to an embodiment of the present invention.

Then, the processor 140 determines whether each of the data codes d1-d6 consists of "3 bars and 3 spaces" or consists of "2 bars and 2 spaces" according to the conditional duration and the durations of the bars and spaces, thereby distinguishing each of the data codes d1-d6 (step S660). More specifically, referring to FIGS. 5 and 7, FIG. 7 is a flow chart of determining whether each data code consists of "3 bars and 3 spaces" or consists of "2 bars and 2 spaces" according to an embodiment of the present invention. In this case, the plurality of bars and the plurality of spaces of the data codes d1-d6 acquired by the processor 140 have output voltages VOUT of different levels and of different width units.

Thus, the processor 140 firstly sums the duration of a first bar and the duration of a first space to form a cumulative duration, with one bar and one space as a group (step S662). The durations of each bar and each space of the data codes d1-d6 in Table 3 are used as an example for description. The processor 140 calculates 71 ms+104 ms=175 ms; namely, the durations of a first bar and a first space of the data code d1 are summed to form a cumulative duration of 175 ms.

Then, the processor 140 sums the current cumulative duration with a duration of the next group of the bar and the space to form the next cumulative duration (step S664). Carrying on with the example above, the processor 140 calculates 175 ms+(109 ms+36 ms)=320 ms; namely, the current cumulative duration (the durations of the first bar and the first space of the data code d1) is summed with the durations of a second bar and a second space of the data code d1 to form the next cumulative duration of 320 ms.

Then, the processor 140 determines whether the next cumulative duration is greater than the conditional duration (step S666). If the next cumulative duration is greater than the conditional duration, then the bars and spaces corresponding to the previous cumulative duration can form a data code. Thus, the processor 140 then uses the bars and spaces corresponding to the previous cumulative duration as one of the data codes d1-d6 (step S667), and determines whether there are a bar and space that have not been summed (step S668). Conversely, it is indicated that the bars and spaces corresponding to the previous cumulative duration cannot form a data code. Thus, the processor 140 returns to the step S664 to proceed to sum the duration of the next group of the bar and the space.

In the process of determining whether there are a bar and a space that have not been summed, if the processor 140 has durations of a bar and a space that have not been summed, it is indicated that the quantities of all the bars and spaces of the data codes d1-d6 have not been determined by the processor 140. In this case, the processor 140 sums again the durations of the current bar(s) and space(s) to form the current cumulative duration (step S669) and returns to the step S664, to accordingly determine the quantities of bars and spaces of the next data code. Conversely, if there are no bar or space that have not been summed, it is indicated that the quantities of all bars and spaces of the data codes d1-d6 have been determined by the processor 140. In this case, the processor 140 performs a step of calculating the widths of the plurality of bars and the plurality of spaces of each data code (step S670).

Carrying on with the example above, after calculating the next cumulative duration to be 320 ms (namely, sum of the durations of the first bar, first space, second bar and second space of the data code d1), the processor 140 determines that the next cumulative duration of 320 ms is less than or equal to the conditional duration of 417.7 ms. In this case, the processor 140 returns to the step S664 to sum the durations of a third bar and a third space of the data code d1; namely, calculate 320+(34+34)=388 ms as the next cumulative duration, and determine that the next cumulative duration of 388 ms is less than or equal to the conditional duration of 417.7 ms.

Then, the processor 140 again returns to the step S664 to sum the durations of a first bar and a first space of the data code d2; namely, calculate 388+(37+31)=456 ms as the next cumulative duration, and determine that the next cumulative duration of 456 ms is greater than the conditional duration of 417.7 ms. In this case, the processor 140 uses the bars and spaces corresponding to the previous cumulative duration as the data code d1 (i.e. the durations of the first bar, first space, second bar, second space, third bar and third space of the data code d1). Then, due to the determination that there are bar(s) and space(s) that have not been summed, the processor 140 re-calculates the current cumulative duration=(37+31)=68 ms; namely, sum again the durations of the first bar and the first space of the data code d2, to return to the step S664 to sequentially determine the quantities of bars and spaces of the data codes d2-d6. Namely, each of the data codes d1, d2, d4, d5 and d6 has "3 bars and 3 spaces", the data code d3 has "2 bars and 2 spaces", and the bars and spaces of each of the data codes d1-d6 have corresponding durations.

After the processor 140 sequentially determines the quantities of the bars and the spaces of the data codes d1-d6, the processor 140 determines that there are no bars and spaces in the data sequence Ar that have not been summed. The processor 140 then calculates the widths of the bars and the spaces in each of the data codes d1-d6 according to the duration of a width of 1 unit and the durations of the plurality of bars and the plurality of spaces, thereby identifying 8-bit data represented by each of the data codes d1-d6 (step S670). More specifically, the processor 140 divides the duration of each bar and the duration of each space by the duration of a width of 1 unit, to calculate the width of each bar and the width of each space in the data codes d1-d6, respectively. A first bar and a first space of the data code d1 as shown in Table 3 are taken as an example, and the duration of a width of 1 unit is 35 ms. For the duration of the first bar being 71 ms, the width of the first bar of the data code d1 is rounded to 71/35=2 units width. For the duration of the first space being 104 ms, the width of the first space of the data code d1 is rounded to 104/35=3 width units. The widths of the bars and spaces of the data codes d1-d6 are shown in Table 4 below.

TABLE 4

|  | Bar | Space | Bar | Space | Bar | Space |
|---|---|---|---|---|---|---|
| Width unit of data code d1 | 2 | 3 | 3 | 1 | 1 | 1 |
| Width unit of data code d2 | 1 | 1 | 3 | 1 | 3 | 2 |
| Width unit of data code d3 | 3 | 4 | 1 | 3 |  |  |
| Width unit of data code d4 | 2 | 2 | 2 | 3 | 1 | 1 |

TABLE 4-continued

|  | Bar | Space | Bar | Space | Bar | Space |
|---|---|---|---|---|---|---|
| Width unit of data code d5 | 1 | 3 | 2 | 1 | 2 | 2 |
| Width unit of data code d6 | 1 | 3 | 1 | 2 | 2 | 2 |

Thus, the width units of the bars and spaces of the data codes d1-d6 are regarded by the processor 140 as characters "233111", "113132", "3413", "222311", "132122" and "131222", respectively, and the 6 characters above each correspond to an 8-bit data, for example, corresponding to decimal numbers 134, 120, 228, 183, 172 and 005, respectively. Accordingly, the processor 140 can identify the 8-bit data represented by each of the data codes d1-d6, according to the width units of the bars and spaces of the data codes d1-d6.

In summary, embodiments of the present invention provide a barcode structure, a method for decoding barcode and a barcode decoding device. In the barcode structure of the present invention, each character consists of "3 bars and 3 spaces" or consists of "2 bars and 2 spaces". Each bar and each space may have different widths, and a maximum width is 4 times of a minimum width. Therefore, one data code of the barcode of the present invention can have 8-bit of information. Thus, based on the same print length of the Code 128 barcode, the information density of the barcode of the present invention can be increased and the encoding and the subsequent operation can be simplified. Besides, the barcode of the present invention can be configured in a plane of an object, annularly arranged on a plane of a disc, or around a circular side of a cylinder, and a plurality of data codes representing 8-bit data are present in the barcode. Therefore, the barcode decoding device of the present invention can identify whether each character of the barcode consists of "3 bars and 3 spaces" or consists of "2 bars and 2 spaces" through a corresponding linear motion, disc rotation or cylinder rotation, thereby identifying 8-bit data represented by each data code.

The above description only provides embodiments of the present invention, but is not intended to limit the scope of the present invention.

What is claimed is:

1. A method for decoding barcode suitable for a barcode decoding device, and for scanning a barcode structure indicating 8-bit data, the barcode structure comprising a data sequence, a start symbol, and an end symbol, the data sequence having a start side and an end side, a plurality of data codes arranged between the start side and the end side, the start symbol connected in series to the start side and sequentially arranged with the bars and the spaces of the data sequence, and the end symbol connected in series with the end side, wherein each data code consists of "3 bars and 3 spaces" or consists of "2 bars and 2 spaces", the bars and the spaces are alternately arranged starting from the bar in each data code, the sum of the widths of the "3 bars and the 3 spaces" is a width of 11 units, and the sum of the widths of the "2 bars and the 2 spaces" is a width of 11 units, the method for decoding barcode comprises:

scanning the barcode arranged on an object;
acquiring the bars and the spaces alternately arranged in the data codes, according to the start symbol of the barcode;
calculating the durations of the start symbol, the bars, the spaces and the end symbol;

summing the durations of the bars and the spaces, thereby calculating an average duration of each of the data codes, and calculating the duration of a width of 1 unit, according to one or a combination of the duration of the end symbol and the duration of the start symbol;

calculating a conditional duration over which the data code can be formed according to the average duration and the duration of a width of 1 unit;

determining whether each of the data codes consists of the "3 bars and the 3 spaces" or consists of the "2 bars and the 2 spaces", according to the conditional duration, the durations of the bars and the durations of the spaces; and calculating the widths of the bars and the widths of the spaces for each of the data codes, according to the duration of a width of 1 unit, the durations of the bars and the durations of the spaces, thereby identifying 8-bit data represented by each of the data codes.

2. The method for decoding barcode of claim 1, wherein the object is a cylinder, the barcode is arranged on a circular side of the cylinder, and the step of scanning the barcode further comprises the steps of rotating the cylinder at a constant angular speed and scanning the barcode on the circular side of the cylinder.

3. The method for decoding barcode of claim 2, wherein the step of acquiring the bars and the spaces alternately arranged in the data codes further comprises the steps of repeatedly generating the start symbol and the data sequence by rotating the object, and acquiring the bars and the spaces alternately arranged in the data codes of the data sequence between two of the start symbols.

4. The method for decoding barcode of claim 1, wherein the object is a disc, the barcode is arranged annularly on a plane of the disc, and the step of scanning the barcode further comprises the steps of rotating the disc at a constant angular speed and scanning the barcode on the plane of the disc.

5. The method for decoding barcode of claim 4, wherein the step of acquiring the bars and the spaces alternately arranged in the data codes further comprises the steps of repeatedly generating the start symbol and the data sequence by rotating the object, and acquiring the bars and the spaces alternately arranged in the data codes of the data sequence between two of the start symbols.

6. The method for decoding barcode of claim 1, wherein the step of calculating the average duration of each of the data codes further comprises the step of:
dividing the cumulative duration of the bars and the spaces by the number of the data codes, to calculate the average duration of each of the data codes.

7. The method for decoding barcode of claim 1, wherein the step of calculating the conditional duration over which the data code can be formed further comprises the step of:
summing the average duration and the duration of a width of 1 unit to calculate the conditional duration over which the data code can be formed.

8. The method for decoding barcode of claim 1, wherein the step of determining whether each of the data codes consists of the "3 bars and 3 spaces" or consists of the "2 bars and 2 spaces" further comprises the steps of:
summing the duration of a first one of the bars and the duration of a first one of the spaces to form a cumulative duration, with one of the bars and one of the spaces as a group;
summing the current cumulative duration and a duration of the next group of the bar and the space to form a next cumulative duration;
determining whether the next cumulative duration is greater than the conditional duration, and if the next cumulative duration is greater than the conditional duration, using the bars and the spaces corresponding to the previous cumulative duration as one of the data codes, and determining whether there are any of the bars and the spaces that have not been summed; and if the next cumulative duration is less than or equal to the conditional duration, returning to the step of forming the next cumulative duration; and
if there are any durations of the bars and the spaces that have not been summed, summing again the durations of the current bar and space as the current cumulative duration and returning to the step of forming the next cumulative duration; if there are no bars and spaces that have not been summed, performing the step of calculating the widths of the bars and the widths of the spaces of each of the data codes.

9. The method for decoding barcode of claim 1, wherein the step of calculating the widths of the bars and the widths of the spaces of each of the data codes further comprises the steps of:
dividing the duration of each bar by the duration of a width of 1 unit and dividing the duration of each space by the duration of a width of 1 unit, to calculate the width of each bar and the width of each space of each of the data codes, respectively.

10. A barcode decoding device scanning a barcode structure indicating 8-bit data, the barcode structure comprising a data sequence, a start symbol, and an end symbol, the data sequence having a start side and an end side, a plurality of data codes arranged between the start side and the end side, the start symbol connected in series to the start side and sequentially arranged with the bars and the spaces of the data sequence, and the end symbol connected in series with the end side, wherein each data code consists of "3 bars and 3 spaces" or consists of "2 bars and 2 spaces", the bars and the spaces are alternately arranged starting from the bar in each data code, the sum of the widths of the "3 bars and the 3 spaces" is a width of 11 units, and the sum of the widths of the "2 bars and the 2 spaces" is a width of 11 units, the barcode decoding device comprises:
an object arranged with the barcode;
a light emitter arranged around the barcode for emitting an incident light signal to the barcode;
a light sensor arranged around the barcode and corresponding to the light emitter, to receive a reflected light signal reflected from the incident light signal and generate an output signal representing the barcode according to the reflected light signal; and
a processor electronically connected to the object and the light sensor for controlling movement of the object and receiving the output signal according to the movement of the object, to decode the barcode according to the output signal, wherein a high level of the output signal represents a bar of the barcode, a low level of the output signal represents a space of the barcode, a low level of the output signal with a width of 5 or more units represents the start symbol of the barcode, and a high level of the output signal with a width of 2 or more units represents the end symbol of the barcode, and the processor is used for performing the steps of:
acquiring the output signal to analyze the barcode according to the output signal;
acquiring the bars and the spaces alternately arranged in the data codes, according to the start symbol of the barcode; calculating the durations of the start symbol, the bars, the spaces and the end symbol;

summing the durations of the bars and the spaces, thereby calculating an average duration of each of the data codes, and calculating the duration of a width of 1 unit, according to one or a combination of the duration of the end symbol and the duration of the start symbol;

calculating a conditional duration over which the data code can be formed according to the average duration and the duration of a width of 1 unit;

determining whether each of the data codes consists of the "3 bars and 3 spaces" or consists of the "2 bars and 2 spaces", according to the conditional duration, the durations of the bars and the durations of the spaces; and calculating the widths of the bars and the widths of the spaces for each of the data codes, according to the duration of a width of 1 unit, the durations of the bars and the durations of the spaces, thereby identifying 8-bit data represented by each of the data codes.

11. The barcode decoding device of claim 10, wherein the object is a cylinder, the barcode is arranged on a circular side of the cylinder, and the processor rotates the cylinder at a constant speed to acquire the output signal.

12. The barcode decoding device of claim 11, wherein the processor repeatedly generates the start symbol and the data sequence by rotating the object, and acquires the bars and the spaces alternately arranged in the data codes of the data sequence between two of the start symbols.

13. The barcode decoding device of claim 10, wherein the object is a disc, the barcode is arranged annularly on a plane of the disc, and the processor rotates the disc at a constant angular speed to acquire the output signal.

14. The barcode decoding device of claim 13, wherein the processor repeatedly generates the start symbol and the data sequence by rotating the object, and acquires the bars and the spaces alternately arranged in the data codes of the data sequence between two of the start symbols.

15. The barcode decoding device of claim 10, wherein the processor divides the cumulative duration of the bars and the spaces by the number of the data codes, to calculate the average duration of each of the data codes.

16. The barcode decoding device of claim 10, wherein the processor sums the average duration and the duration of a width of 1 unit to calculate the conditional duration over which the data code can be forming.

17. The barcode decoding device of claim 10, wherein the step of determining, by the processor, whether each of the data codes consists of the "3 bars and 3 spaces" or consists of the "2 bars and 2 spaces" further comprises the steps of:

summing the duration of a first one of the bars and the duration of a first one of the spaces to form a cumulative duration, with one of the bars and one of the spaces as a group;

summing the current cumulative duration and a duration of the next group of the bar and the space to form a next cumulative duration;

determining whether the next cumulative duration is greater than the conditional duration, and if the next cumulative duration is greater than the conditional duration, using the bars and the spaces corresponding to the previous cumulative duration as one of the data codes, and determining whether there are any of the bars and the spaces that have not been summed; and if the next cumulative duration is less than or equal to the conditional duration, returning to the step of forming the next cumulative duration; and if there are any durations of the bars and the spaces that have not been summed, summing again the durations of the current bar and space as the current cumulative duration and returning to the step of forming the next cumulative duration; if there are no bars and spaces that have not been summed, performing the step of calculating the widths of the bars and the widths of the spaces of each of the data codes.

18. The barcode decoding device of claim 10, wherein the processor divides the duration of each bar by the duration of a width of 1 unit and divides the duration of each space by the duration of a width of 1 unit, to calculate the width of each bar and the width of each space for each of the data codes, respectively.

* * * * *